United States Patent Office 3,728,341
Patented Apr. 17, 1973

3,728,341
PROCESS FOR THE PURIFICATION OF CEPHALEXIN
Harold A. Crisp, Harrow Weald, John F. Oughton, Gerrards Cross, and Graham A. Pearce, Woodnesborough, near Sandwich, England, assignors to Glaxo Laboratories Limited, Middlesex, England
No Drawing. Filed July 20, 1970, Ser. No. 56,261
Claims priority, application Great Britain, July 25, 1969, 37,491/69
Int. Cl. C07d 99/24
U.S. Cl. 260—243 C                1 Claim

ABSTRACT OF THE DISCLOSURE

A new crystalline form of cephalexin i.e. the γ-form. A process for the manufacture of cephalexin having this form comprises contacting cephalexin having the β-crystalline form with methanol. The β-crystalline form in highly pure pharmaceutical grade can be obtained by contacting the so-produced α-cephalexin with an aqueous medium.

---

This invention relates to a process for the purification of 7β-(D-2-aminophenylacetamido)-3-methylceph-3-em-4-carboxylic acid (common name cephalexin) and to a new crystalline form of cephalexin thereby obtained.

The cephalosporin compounds referred to in this specification are generally named with reference to cepham (see J.A.C.S., 1962, 84, 3400 and J. Chem. Soc., 1965, 5031). The term "cephem" refers to the basic cepham structure with one double bond.

When cephalexin is recovered in crystalline form from an aqueous medium it exhibits a rod-like structure which, when dried, is very hydroscopic and tends to occlude impurities resulting from its preparation. This crystalline form may be designated the β-form. The impurities referred to may, for example, result from the presence of triethylamine added to neutralise excess formic or acetic acid use in a zinc/acid reduction of 2,2,2-trichloroethyl 7β - [D(—)-N-(2,2,2-trichloroethoxycarbonyl)-2-aminophenylacetamido]-3-methylceph-3-em-4-carboxylate or the like precursor of cephalexin.

We have now found that when the β-form of cephalexin is slurried in methanol, impurities such as triethylamine, which are present are readily taken up by the methanolic phase and the crystalline structure undergoes a metamorphosis to another distinct crystalline form which we designate the γ-form. In contrast to the dried β-form, the γ-form is much less hydgroscopic taking up between 1 and 2% of water compared to the 5 to 7% for the β-form at normal relative humidities. The γ-form in turn can be metamorphosed to the β-form by contacting it with an aqueous medium. The invention thus enables both the β and γ forms to be obtained in highly pure pharmaceutical grades.

The invention therefore provides a process for the manufacture of cephalexin having the γ-crystalline form which comprises contacting cephalexin having the β-crystalline form with methanol to form a suspension in which the total content of water is less than about 2% (w./v.), taking up any impurities in the methanolic phase and allowing the γ-form to develop. The γ-form may then be recovered by filtration, washing with methanol if desired and drying.

The invention further provides the γ-crystalline form of cephalexin characterized by having the following X-ray diffraction data:

| d (A.) | I. | d (A.) | I. |
|---|---|---|---|
| 10.46 | w | 3.23 | mw |
| 8.18 | w | 3.00 | vw |
| 7.64 | w | 2.93 | w |
| 7.05 | w | 2.84 | w |
| 6.47 | vw | 2.72 | vwd |
| 5.96 | w | 2.61 | wd |
| 5.34 | vwd | 2.52 | w |
| 4.75 | m | 2.49 | wd |
| 4.64 | m | 2.41 | wd |
| 4.01 | md | 2.34 | vw |
| 3.93 | m | 2.29 | w |
| 3.83 | w | 2.11 | vwd |
| 3.70 | wd | | |

This may be compared with X-ray diffraction data of the β-form:

| d (A.) | I. | d (A.) | I. |
|---|---|---|---|
| 15.55 | s | 3.53 | vw |
| 11.86 | s | 3.48 | vw |
| 10.67 | m | 3.26 | vwd |
| 9.47 | vw | 3.13 | m |
| 8.28 | w | 3.06 | m |
| 7.93 | w | 2.94 | w |
| 5.87 | vw | 2.89 | w |
| 5.76 | vw | 2.86 | m |
| 5.49 | w | 2.76 | m |
| 5.33 | vs | 2.69 | w |
| 5.21 | m | 2.65 | w |
| 4.86 | m | 2.62 | wd |
| 4.73 | wd | 2.58 | vw |
| 4.48 | w | 2.57 | vw |
| 4.33 | m | 2.51 | vw |
| 4.16 | m | 2.47 | vw |
| 4.02 | vw | 2.42 | wd |
| 3.95 | w | 2.40 | w |
| 3.90 | vw | 2.26 | wd |
| 3.87 | vw | 2.10 | vw |
| 3.81 | m | 1.86 | vw |
| 3.73 | m | 1.85 | vw |
| 3.57 | md | 1.84 | vwd |

The X-ray diffraction data were measured from film taken on a Guinier powder X-ray camera using copper Kα-radiation. The relative intensities (I) of the lines is given according to the following arbitrary basis:

s=strong
m=medium
w=weak
d=diffuse
v=very

The γ-form of cephalexin exists as hexagons or elongated hexabons compared with the β-form which exists as needles which clump together as evidenced by photomicrographs.

The γ-crystalline form of cephalexin may also be characterized by the peaks it displays in the infra-red spectrum. The characteristic frequencies of the γ-crystalline form and the β-form are given below.

| γ-form: | β-form: |
|---|---|
| 3500 | 3620 |
| 3210 | 3270 |
| 1774 | 2600 |
| 1692 | 1772 |
| 1540 | 1754 |
| 1344 | 1686 |
| 1324 | 1592 |
| 1262 | 1352 |
| 750 | 1270 |
| 696 | 1194 |
|  | 1070 |
|  | 738 |
|  | 694 |

The infra-red spectra were run in Nujol mull and the above figures are given in cm.$^{-1}$ corrected to ±2 cm.$^{-1}$.

The γ-crystalline form of cephalexin according to the invention may be formulated for administration in any convenient way by analogy with other antibiotic substances, such as penicillin and neomycin.

The methanol used in the process according to the invention may be of a commercial grade; however, it is not generally desirable to work with grades of methanol containing more than ~1% water (w./v.). The cephalexin β-form starting material will generally be associated with water owing to its hygroscopic nature so that this will also contribute to the water content of the suspension obtained when the cephalexin is contacted with methanol. The cephalexin starting material for the process may contain up to about 8% of water. The total amount of water in the methanolic suspension should be less than about 2% (w./v.).

The suspension should contain sufficient methanol to allow it to be stirrable and thus permit control over the process.

To obtain pure β-form of cephalexin, the γ-form obtained by the process according to the invention is contacted with water or a partially aqueous medium, for example a mixture of water and a water miscible ketone, and the pure β-form allowed to develop.

In order that the invention may be well understood the following examples are given by way of illustration only.

The superior quality of cephalexin produced by the processes of the invention is best demonstrated by stability testing and an examination of the N.M.R. spectra.

The N.M.R. spectrum of the starting crude β-form cephalexin used for Examples 1 and 2 showed the presence of about 0.85% of triethylamine, relative to cephalexin, recognised by the triplet resonance centred at τ8.70 in trifluoroacetic acid-deuterium oxide. The spectra of the products from Examples 1 and 2 were similar to an existing spectrum for cephalexin and showed no trace of the peaks centred at τ8.70.

The starting crude cephalexin also blackened a moistened lead acetate paper hung above a sample heated at 100° for 10 minutes in a test tube. The products from the Examples 1 and 2 showed only a slight browning of the tip of the lead acetate paper when tested under the same conditions. When heated at 100° for 2 hours the starting cephalexin turned yellow, but the products from Examples 1 and 2 showed no visible change under these conditions.

EXAMPLE 1

Preparation of pure γ-form of cephalexin

Cephalexin having the β-form (1 kg. containing 7.1% by weight of water) was added in a thin stream to stirred methanol (5000 ml.) and the suspension stirred for 30 minutes. The solid was filtered off, washed with methanol (5× 1000 ml.), and dried under reduced pressure at 40° to constant weight to give a cream powder 853.9 g., $[\alpha]_D$ +150° (pH 4.4 buffer); $\lambda_{max.}$ 263 nm.

$E^{1\%}_{1 cm.}$ 223 moisture (Karl Fischer) 0.8%; acetone 0.1%; methanol, trace; triethylamine <0.1%; Zn, 3 p.p.m.; pH (0.5% solution in water) 4.5; electrophoresis: single spot. Crystalline γ-form identified by the infra-red spectrum and photomicrographs. The product was identified as cephalexin by its N.M.R. spectrum.

EXAMPLE 2

Preparation of pure β-form of cephalexin via the pure γ-form

Cephalexin having the β-form (1 kg. containing 7.1% by weight of water) was added in a thin stream to stirred methanol (5000 ml.) and the slurry stirred for a further 30 minutes. The solid was filtered off, washed with methanol (3× 1000 ml.) and then with acetone (3× 1000 ml.). The wet cake was stirred with sufficient water to make a smooth cream and the isolated product was dried at 40° under reduced pressure to give a pale cream powder 871 g., $[\alpha]_D$ +153° (pH 4.4 buffer), $\lambda_{max.}$ 263 nm.

$E^{1\%}_{1 cm.}$ 223

(both calculated to dry); moisture (Karl Fischer) 2.7%; pH (0.5% solution in water), 4.9; Zn, 3 p.p.m., electrophoresis: single spot. Crystalline β-form identified by the infra-red spectrum and photomicrographs; N.M.R. spectrum as standard.

EXAMPLE 3

Cephalexin having the β-form was dried at 40° under reduced pressure to a water content of 1.12% estimated by Karl Fischer determination. The dried material (10.3 g.) was added to stirred methanol (50 ml., residual water content 0.03%) at 35°. The water content of the methanol was varied with the experiment. Samples of the slurry were removed at intervals and examined under 100× magnification to observe the change in crystal form from β to γ. This change is well defined, is easily observable under the microscope and is accompanied by a change in the nature of the suspension. Either the change occurred rapidly (within the first 5 to 10 minutes) or had not taken place after 2 hours. Where the change took place the slurry was filtered off at the end of 30 minutes stirring and washed by displacement with methanol (35–40 ml.) containing the appropriate amount of water. Where the change did not take place the slurry was filtered off and washed as before at the end of two hours. The results are tabulated below with infra-red confirmation.

| Percent water added to methanol | Change to S-form | Infra-red spectrum type | Recovery, percent w./v. |
|---|---|---|---|
| Zero | Yes | γ-form | 92.6 |
| 1 | Yes | do | 93.2 |
| 2 | No | β-form | 89.0 |
| 3 | No | do | 89.0 |
| 5 | No | do | 90.2 |

We claim:
1. A process for the manufacture of pure cephalexin in the β-crystalline form, comprising contacting crude cephalexin having the β-crystalline form with methanol to form a slurry of cephalexin in which the total amount of water is less than about 2% w./v. and in which the impurities are taken up in the methanolic phase, said cephalexin undergoing a metamorphosis to the γ-form; separating said γ-form of cephalexin free of impurities from said methanolic phase and contacting the separated pure γ-form of cephalexin with water or a partially aqueous medium to cause the pure β-crystalline form to develop.

References Cited

UNITED STATES PATENTS

| | | | |
|---|---|---|---|
| 3,531,481 | 9/1970 | Pfeiffer | 260—243 C |
| 3,496,171 | 2/1970 | Pfeiffer et al. | 260—243 C |
| 3,497,505 | 2/1970 | Pfeiffer et al. | 260—243 C |

NICHOLAS S. RIZZO, Primary Examiner

U.S. Cl. X.R.

426—246